J. WELLNER.
SOUND REPRODUCING MACHINE.
APPLICATION FILED DEC. 15, 1903.

928,567.

Patented July 20, 1909.
7 SHEETS—SHEET 2.

WITNESSES:

INVENTOR
Julius Wellner
BY
ATTORNEY.

J. WELLNER.
SOUND REPRODUCING MACHINE.
APPLICATION FILED DEC. 15, 1903.

928,567.

Patented July 20, 1909.
7 SHEETS—SHEET 3.

WITNESSES:
W. W. Canby
H. H. Gamble

INVENTOR
Julius Wellner
BY
A. V. Groupy
ATTORNEY.

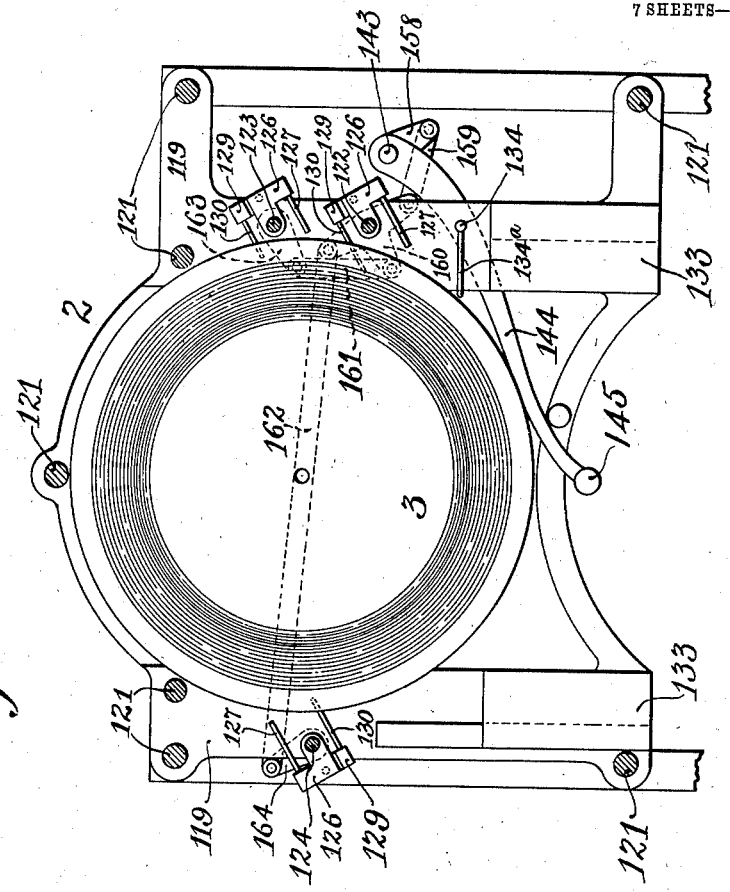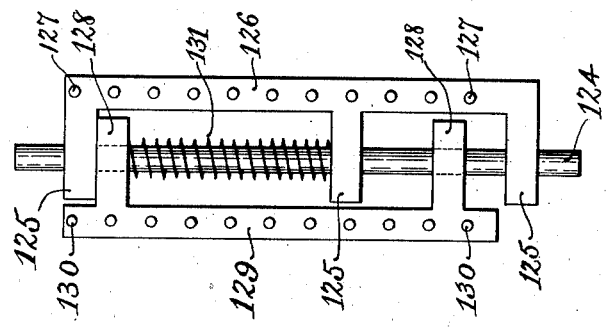

J. WELLNER.
SOUND REPRODUCING MACHINE.
APPLICATION FILED DEC. 15, 1903.

928,567.

Patented July 20, 1909.
7 SHEETS—SHEET 5.

J. WELLNER.
SOUND REPRODUCING MACHINE.
APPLICATION FILED DEC. 15, 1903.
928,567.
Patented July 20, 1909.
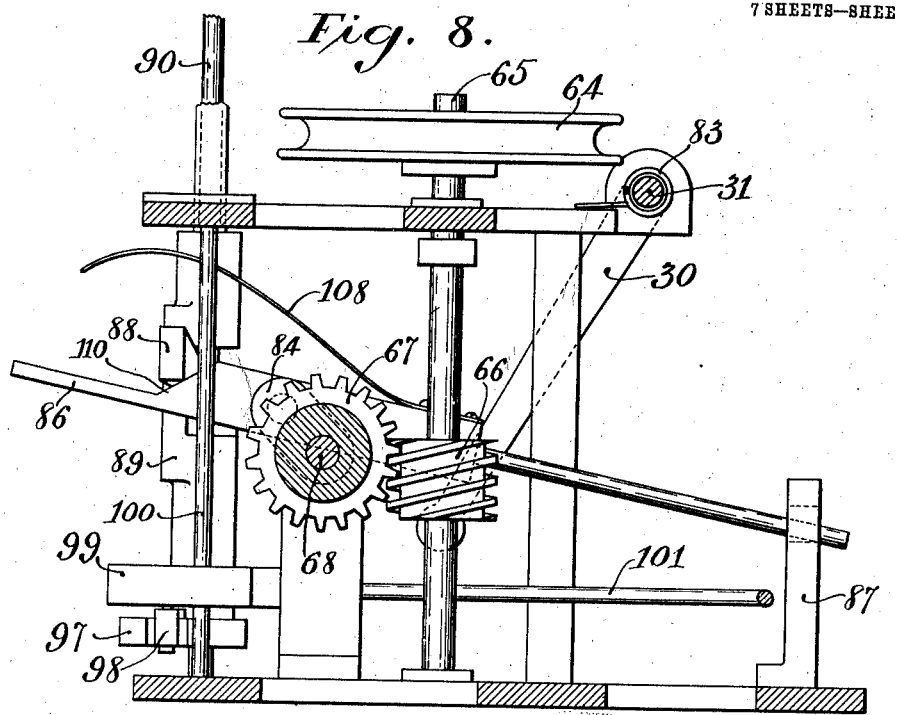
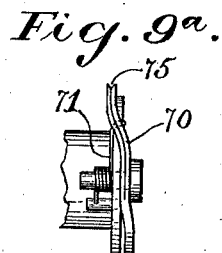
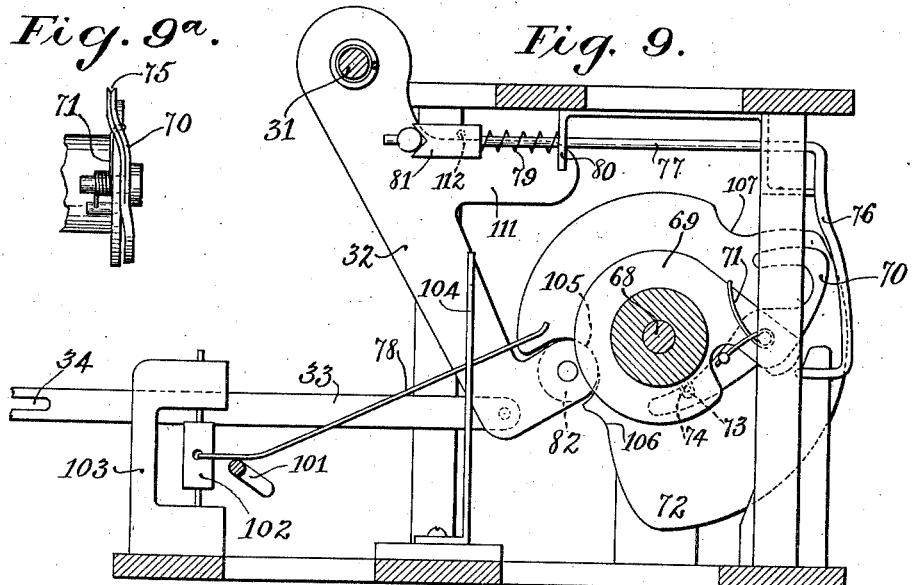

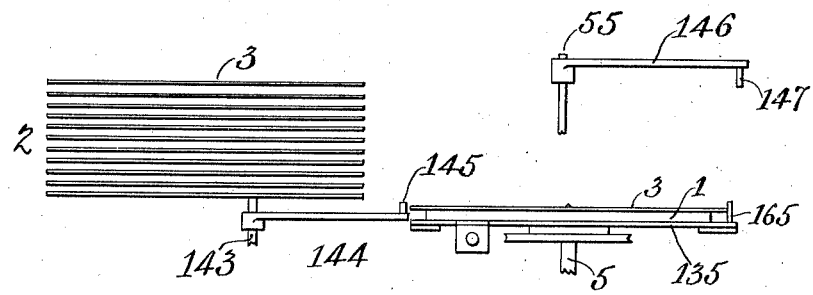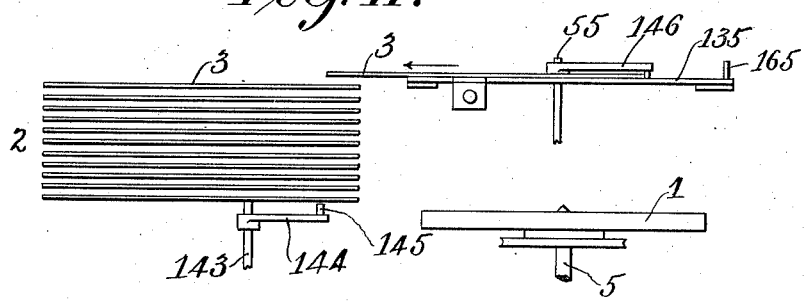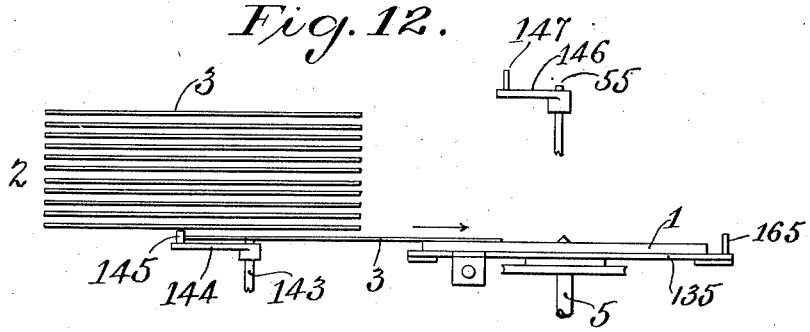

UNITED STATES PATENT OFFICE.

JULIUS WELLNER, OF PHILADELPHIA, PENNSYLVANIA.

SOUND-REPRODUCING MACHINE.

No. 928,567.   Specification of Letters Patent.   Patented July 20, 1909.

Application filed December 15, 1903. Serial No. 185,304.

*To all whom it may concern:*

Be it known that I, JULIUS WELLNER, a citizen of the United States, residing at Philadelphia, in the county of Philadelphia and State of Pennsylvania, have invented certain new and useful Improvements in Sound-Reproducing Machines, of which the following is a specification.

This invention relates to sound reproducing machines.

The main object of the invention is to provide machines of this character with means whereby one of a plurality of records may be transferred from a suitable magazine or support to the rotatable record support, for the purpose of reproducing the record, and also to transfer the record from the rotatable support back to the magazine.

With this and other objects in view, the invention consists in the novel construction and combinations of parts all of which will be hereinafter fully described and claimed.

Figure 1:
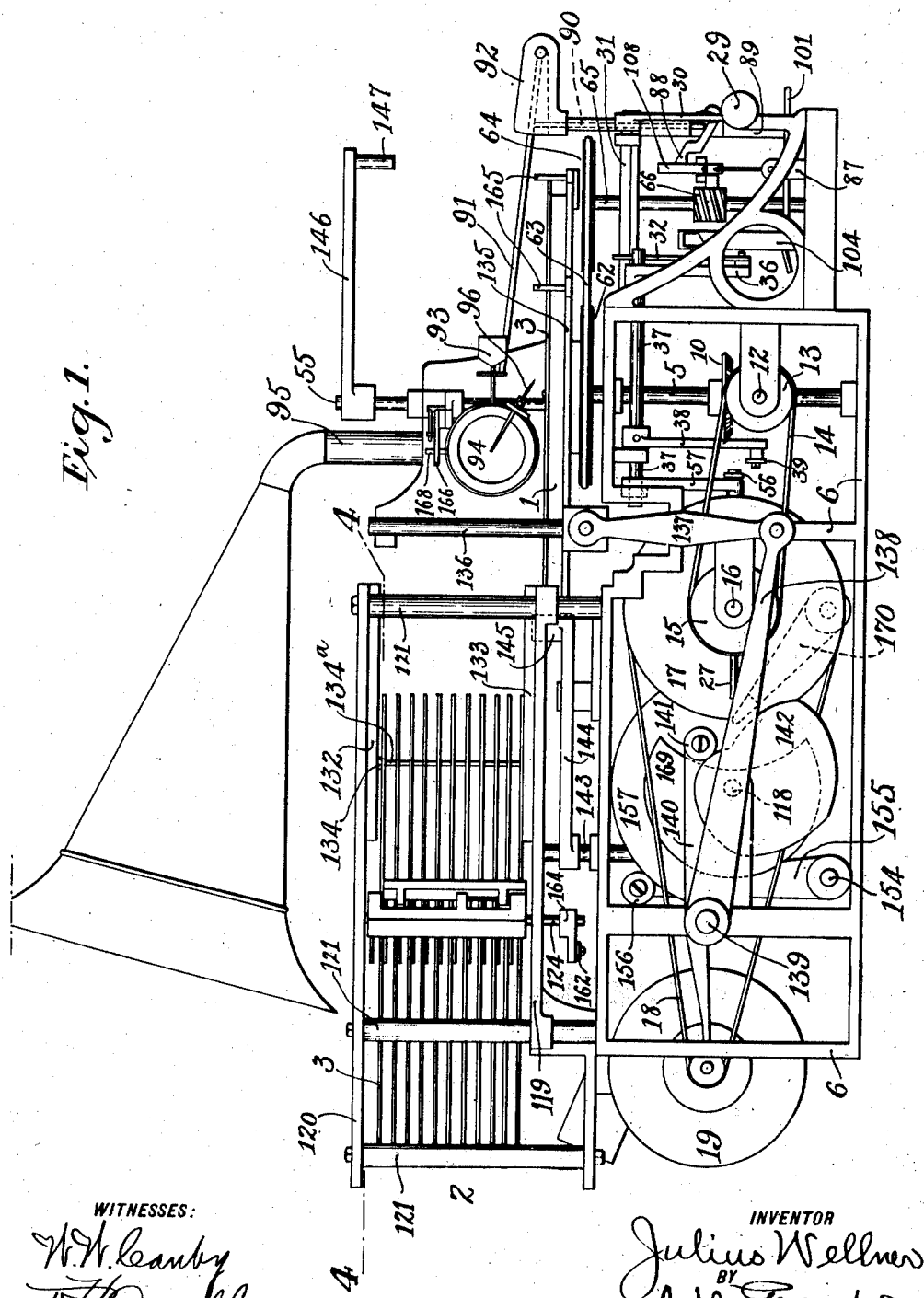
Figure 2:
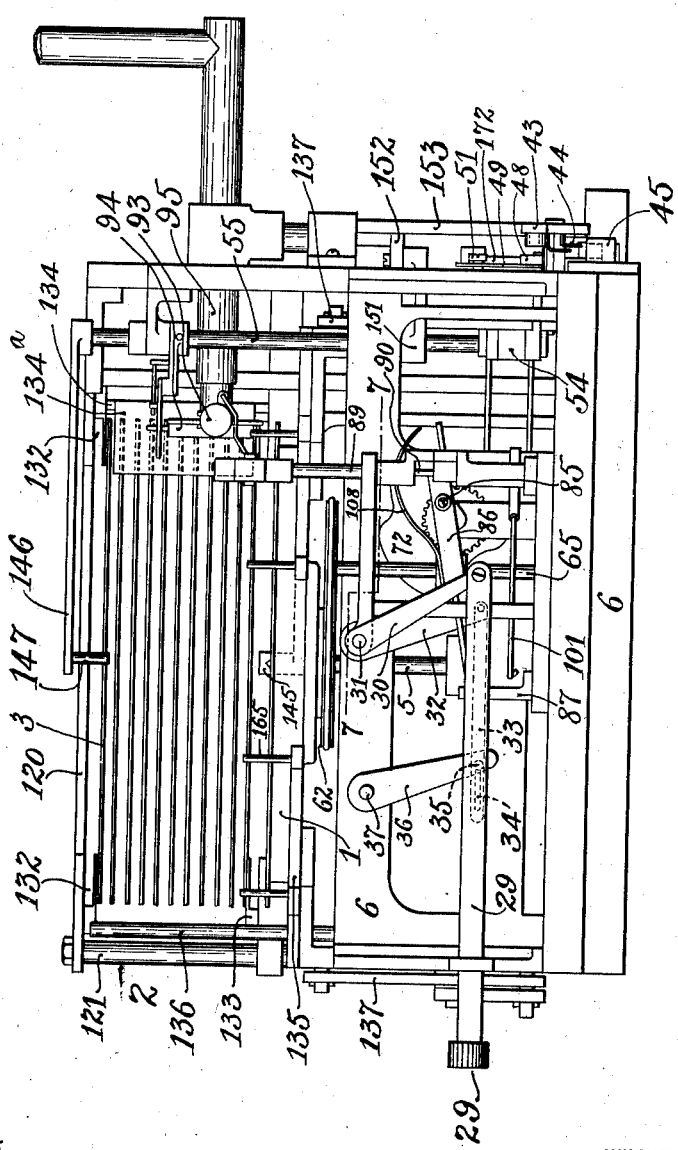
Figure 3:
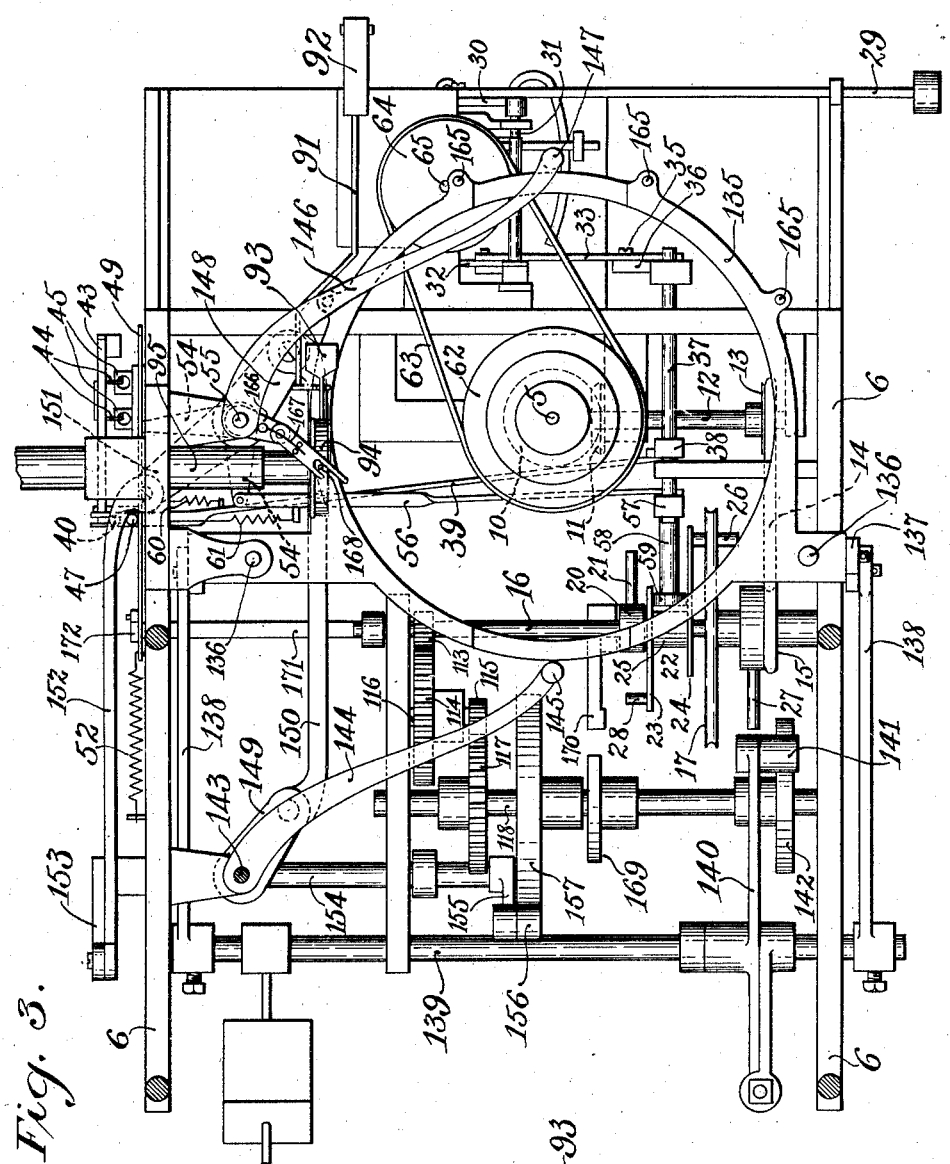
Figure 3A:
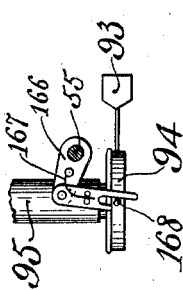
Figure 7:
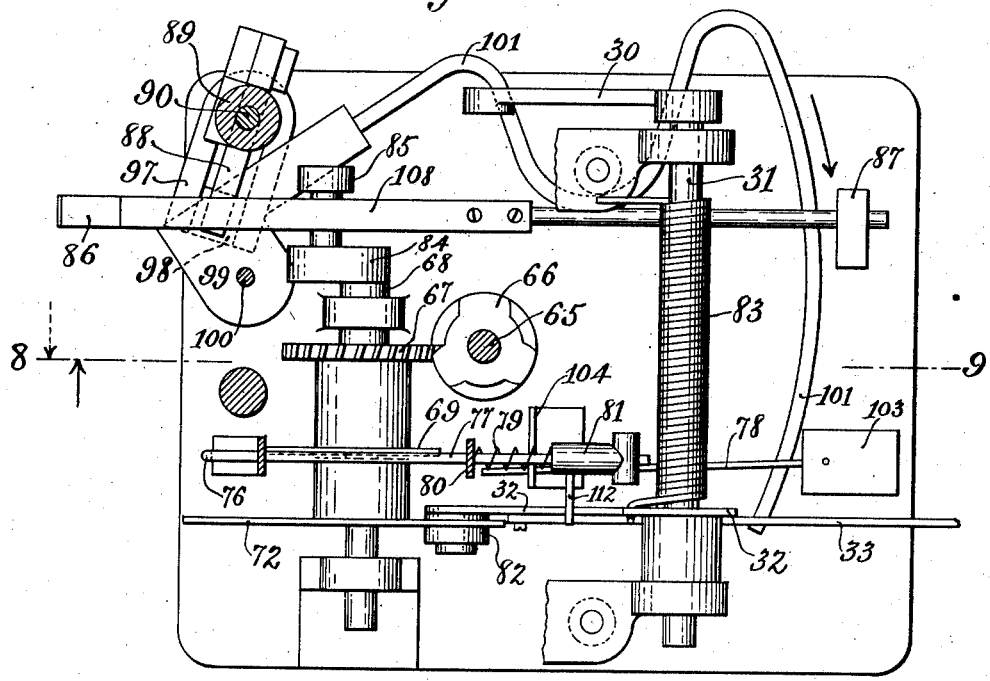
Figure 6:
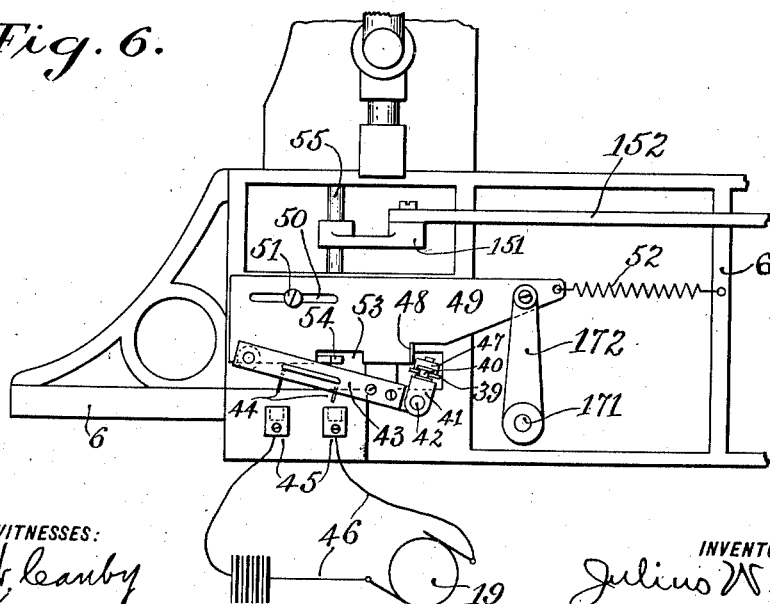

In the drawings Figure 1 is a side elevation of my improved sound reproducing machine. Fig. 2 is an end elevation thereof. Fig. 3 is a sectional plan view, showing the record magazine and turn-table removed. Fig. 3ª is a detail, in plan, of a jointed arm and the sound box. Fig. 4 is a sectional plan, as on the line 4—4 of Fig. 1. Fig. 5 is a detail of a part of the mechanism for supporting and lowering the records. Fig. 6 is a detail, in elevation, of a part of the automatic mechanism for stopping the machine, and adjuncts. Fig. 7 is a sectional plan view, as on the line 7—7 of Fig. 2. Figs. 8 and 9 are sectional elevations as on the line 8—9 of Fig. 7, Fig. 8 as seen from the dotted line arrow and Fig. 9 as seen from the full line arrow. Fig. 9ª is a detail of a part of Fig. 9, as seen from the right hand side of the latter figure. Figs. 10, 11 and 12 are diagrammatic views showing the series of records, the turn-table and different positions of the parts directly concerned in transferring the records from the series to the turn-table and back again; Fig. 10 showing the position of the parts while a record is being reproduced, Fig. 11 showing a record raised from the turn-table and being moved horizontally to the top of the series, and Fig. 12 showing the lowermost disk of the series being moved to and upon the turn-table.

1 designates a turn-table for supporting and rotating the records which in the present instance, are the well known flat disks provided with the usual helical groove or composition to be reproduced; and 2 designates a magazine in which are arranged a series of superposed record disks 3.

By the operation of one of the parts of the mechanism hereinafter described, either manually, by a suitable coin controlled mechanism or in any other desirable manner, the machine is operated to reproduce the composition of the record disk upon the turn-table, to transfer the record disk from the turn-table to the top of the series of disks 3, and to transfer the lowermost disk 3 to the top of the turn-table or playing position, after which the machine is automatically stopped with its parts in position for a succeeding operation. Thus it will be observed that as the mechanism is successively operated, as above described, the record disks will be successively reproduced, one disk away from the groove thereof being reproduced at each operation of the machine.

The turn-table 1 is mounted on a vertical shaft 5 having its bearings in the main frame 6 and being provided with a bevel gear wheel 10 which is driven by a similar wheel 11 on a horizontal shaft 12. This shaft has affixed thereto a pulley 13 which is driven by a belt 14 actuated by a pulley 15 which is loosely mounted on a horizontal clutch shaft 16. Arranged adjacent to the pulley 15 is a pulley 17 which is also loosely mounted on the clutch shaft 16 and is driven by a belt 18 from a suitable motor 19 which, in the present instance is an electric motor. Fixed to the clutch shaft 16 is a collar 20 provided with a projecting pin 21, and mounted on the clutch shaft, between the collar 20 and the pulley 17, is a freely rotatable and laterally movable clutch member 22 comprising a pair of disks 23 and 24 connected together by a collar 25. The disk 24 carries a pin 26 which extends through and is engaged with the pulley 17 and is adapted to be engaged with a pin 27 projecting from the hub of the pulley 15; and the disk 23 is provided with a pin 28 which is adapted to be engaged with the pin 21. Thus it will be seen that when the clutch member 22 is shifted to engage the pin 26 with the pin 27, the turn-table 1 will be rotated by the motor 19; and when the clutch member is shifted to engage the pin 28 with the pin 21, thereby moving the pin 26 from engagement with the pin 27, the turn-table will cease to rotate and the motor will rotate the clutch shaft 16.

When the machine is started, the clutch member is shifted to engage the pin 26 with the pin 27 to rotate the turn-table 1, and, at the same time, the electric current is supplied to the motor. The perferred means to this end is as follows:—Fitted to the main frame 6 is a reciprocative bar 29 forming that part of the mechanism which may be moved outwardly either manually or automatically, as stated, to start the machine. The inner end of the bar 29 is connected to an arm 30 depending from a rock shaft 31. This shaft 31 is provided with an arm 32 which is connected to one end of a link 33 the other end of which is provided with a slot 34 into which extends a pin 35 carried by an arm 36 depending from a rock shaft 37 from which depends another arm 38. Pivoted to the arm 38 is one end of a bar 39 the other end of which is bifurcated for the reception of a pin 40 projecting from an arm 41 which is pivoted to the side frame, as at 42. The arm 41 is provided with an insulated extension 43 carrying two connected contact points 44 which, when the arm 41 is rocked to lower the extension 43, will enter two mercury contact cups 45 and thereby complete an electric circuit 46 to supply current to the motor 19. The bar 39 is provided with a roller 47 which is adapted to engage a projection 48 on a reciprocative plate 49 to hold the extension 43 of the arm 41 in the raised position. The plate 49 is provided with a slot 50 and is supported by a screw 51 projecting from the side frame and extending through the slot 50 in a manner to permit the lower edge of the plate 49 to be rocked outwardly for a purpose hereinafter explained. The projection 48 is held in engagement with the roller 47 by a spring 52 secured at one end to the plate 49 and at the other end to the main frame, the bar 39 taking against the side frame and limiting the movement of the plate. The lower edge of the plate 49 is provided with an off-set 53 into which extends one end of a bell-crank lever 54 which is loosely mounted on a vertical shaft 55. The other end of lever 54 is connected by a link 56 to the lower end of an arm 57 which is loosely mounted on and depends from the rock shaft 37. Projecting from the lower end of the arm 57 is a stud 58 carrying on its free end a roller 59 which is arranged between the disks 23 and 24 of the clutch member 22, to the end that, when the arm 57 is rocked, the clutch member 22 will be laterally shifted.

By the construction just described it will be seen that, when the bar 29 is drawn outwardly, the outer end of the bar 39 will be drawn inwardly, against the action of a suitable spring 60, thereby disengaging the roller 47 from the projection 48 and permitting the extension 43 of the arm 41 to drop and complete the electrical circuit 46 to start the motor 19, the bar 39 being connected to the arm 38 sufficiently loose to permit it to rock with the arm 41. Immediately following the disengagement of the roller 47 from the projection 48, the spring 52 draws the plate 49 forward and the off-set 48 engages and rocks the bell-crank lever 54 which moves the link 56 against the action of a suitable spring 61 to rock the arm 57 which shifts the clutch member 22 to engage the pin 26 with the pin 27; whereupon the turn-table 1 starts to rotate.

The turn-table shaft 5 is provided with a pulley 62 which is connected by a belt 63 with a pulley 64 on the upper end of a vertical shaft 65. This shaft 65 carries a worm 66 in engagement with a worm wheel 67 which is mounted to rotate freely upon a horizontal shaft 68. The hub of the worm wheel 66 carries a projection 69 to which is pivoted a latch lever 70. The inner end of the lever 70 is, by the action of a suitable spring 71, held normally against the hub of a cam 72, hereinafter referred to, which is fixed to the shaft 68. The inner end of the lever 70 is provided with a notch 73 which is adapted to engage a projection 74 on the hub of the cam 72 and thereby lock the shaft 68 to rotate with the worm wheel 67. The outer end of the lever 70 is bent laterally, as shown in Fig. 9ª, and is provided in its edge with a cam groove 75 which, during the rotation of the shaft 68, is adapted to engage the lower end of an arm 76 depending from a horizontal rock shaft 77 and also to engage the free end of an arm 78 hereinafter referred to, in a manner to move the notch 73 from engagement with the projection 74. The arm 76 is held normally in position by the friction of a spring 79 engaging the bearing 80 of the shaft 77 and a collar 81 secured to said shaft. Bearing against the cam 72 is a roller 82 carried by the arm 32 hereinbefore referred to, a suitable spring 83 being provided to maintain the roller 82 in engagement with the cam.

The shaft 68 is provided with a crank arm 84 carrying a projecting pin 85 which extends through and supports one end of a bar 86, the other end of which extends freely through an opening in a lug 87 projecting from the frame, to the end that, when the shaft 68 is rotated, the bar 86 will be raised and lowered and, at the same time, longitudinally reciprocated. The bar 86 is arranged to engage the under side of the free end of an arm 88 the other end of which is pivoted to a vertically-arranged shaft 89. Extending through the upper portion of the shaft 89 and slidingly fitted thereto is a rod 90. The lower end of this rod 90 rests upon the arm 88, and resting upon the top of the rod 90, is a horizontal arm 91 one end of which is pivoted to an extension 92 on the upper end of the shaft 89. The other end of the arm 91 is provided with an upwardly projecting forked end which engages a weighted arm 93 projecting from the sound box 94 which is of usual and well known construction. The sound box 94 is mounted on a telescopic tube support 95 in a manner to be partially rotatable to engage and disengage the stylus 96 from the record, and radially movable with respect to the record upon the turn-table to permit the inward movement of the stylus during its engagement with the groove of the record and its outward movement to its normal position for a succeeding operation.

The lower end of the vertical shaft 89 is provided with a bifurcated projecting arm 97 to which is fitted a block 98 pivoted to an arm 99 projecting from a vertical rock shaft 100, to the end that when the shaft 89 is rocked, the shaft 100 will also be rocked. The arm 99 carries a projection 101 provided with a curved end which is arranged to be moved back and forth beneath the arm 78, hereinbefore referred to, when the shaft 100 is rocked. One end of the arm 78 is horizontally pivoted to a block 102 which, in turn, is vertically pivoted to a bracket 103 on the main frame. The arm 78 rests normally upon the curved end of the projection 101 and its other or free end extends through an opening in a plate 104 projecting from the main frame, the free end of the arm 78 being arranged to engage the cam groove 75 in the lever arm 70.

The cam 72 is provided with a deep notch 105 and two other notches 106 and 107; and, prior to starting the machine, the roller 82 rests in the deep notch 105, the notch 73 of the lever 70 is in engagement with the projection 74, the lower end of the arm 76 is in position to engage the inner end of the cam groove 75, and the sound box occupies its normal position: that is, a position above the outer portion of the record disk upon the turn-table, the stylus being raised out of engagement with the disk. When the bar 29 is moved outwardly to start the machine; the arm 32 is rocked to disengage the roller 82 from the notch 105, and, immediately following the starting of the machine, the outward pull or pressure of the bar 29 is removed and the spring 83 moves the roller 82 into engagement with the notch 106. Just as the roller 82 enters the notch 106, the cam groove 75 in the lever 70 engages the arm 76 and thereby moves its notch 73 from engagement with the projection 74, whereupon the shaft 68 remains idle while the worm wheel 67 is turned a complete revolution to permit the turn-table to acquire the desired speed before engaging the stylus 96 with the groove of the record disk. It will be observed that, as the end of the arm 76 traverses the groove 75, it is cammed out of position to reengage the inner end of the groove 75 and that, when the lever 70 again meets the arm 76, the side of the lever 70 engages the arm 76 and moves the latter still farther out of position; therefore, after the worm wheel 67 has made a complete revolution, the spring 71 causes the lever 70 to ride over and engage its notch 73 with the projection 74. This being done, the shaft 68 is turned by the worm wheel 66 about a half revolution, thereby causing the crank arm 84 to lower the bar 86, whereupon the arm 88, the rod 90 and the arm 91 are lowered by gravity, and the weighted arm 93 turns the sound box 94 to engage the stylus 96 with the record disk. It will be observed that the bar 86 is provided with a curved projection 108 which extends over the arm 86, and that the crank 84 not only lowers but also retracts the bar 86 during the half turn of the shaft 68. This retraction of the bar 86 causes the projection 108 to engage the arm 88 by friction and thereby turn the shaft 89 until the arm 91 carried thereby moves the sound box 94 inwardly to engage the stylus 96 with the outer turn of the groove of the record disk, whereupon the shaft 89 ceases to turn and the projection 108 passes idly over the arm 88. After the shaft 68 has been turned a half revolution, as above stated, the roller 82 engages the notch 107 to prevent further rotation of the shaft 68, and at the same time, the groove 75 of the lever 70 engages the free end of the arm 78 and rocks said lever to disengage its notch 73 from the projection 74 and thereby disconnect the shaft 68 from the worm wheel 67.

I have now reached what I term "the playing position;" that is, the record disk upon the turn table 1 is being rotated and the stylus 96 is traversing its groove to reproduce the composition, in the well known manner; and, at the same time, the stylus is moving toward the center of the disk. As the stylus 96 moves toward the center of the disk, the arm 91 is moved therewith in a manner to slowly turn the shaft 89 which, through the arms 97 and 99, slowly turns the shaft 100, thereby gradually moving the curved end of the projection 101 in the direction indicated by the arrow in Fig. 7. As the curved end of the projection moves in this direction, it engages the arm 78 by friction and tends to maintain the latter in the position shown; that is, against the wall of the opening in the plate 104. During each successive revolution of the worm wheel 67, while the composition is being reproduced, the free end of the arm 78 engages the lever 70 and prevents the notch 73 from engaging the projection 74; and each time the arm 78 engages the lever 70, it is cammed to one side by the groove 75 and out of line with the inner end of said groove, but before the lever 70 again meets the arm 78, the latter is moved by the friction of the curved end of the projection 101 to its normal position to engage the inner end of the groove 75. Thus the arm 78 is rocked back and forth during the playing of the record. After the stylus has reached the inner end of the groove of the record disk, it ceases to move inwardly, and, consequently, the projection 101 also ceases to move; therefore, when the arm 78 is cammed to one side by the groove 75, it is not returned to its normal position by the projection 101; consequently, the notch 73 of the lever 70 is permitted to engage the projection 74 and lock the shaft 68 to rotate with the worm wheel 67 until the shaft 68 has been given another half revolution and returned to its original position, as follows:—The first movement of the shaft 68 causes the crank arm 84 to raise the bar 86 which raises the arm 88, the rod 90, the arm 91 and the weighted arm 93, thereby turning sound box 94 to disengage the stylus 96 from the record disk 3. This being done, the crank arm 84 moves the bar 86 longitudinally, thereby causing a shoulder 110 on the bar 86 to engage the arm 88 and turn the shaft 89 in a manner to cause the arm 91, carried by the shaft 89, to move the sound box 94 outwardly to a position beyond the outside line of the record disk, whereupon the roller 82 engages the deep notch 105 of the cam 72 and locks the shaft 68 against further rotation. As the shaft 89 is being turned to move the sound box 94 outwardly, the shaft 100 is also being turned to move the arm 99 and projection 101 in the reverse direction for a succeeding operation.

The arm 32 is provided with a projection 111 which, when the roller 82 enters the deep notch 105, is adapted to engage a pin 112 projecting from the shaft 77 and thereby move the arm 76 to its original position for reëngagement by the lever 70.

Simultaneously with the stopping of the shaft 68, the clutch member 22 is shifted to disengage the pin 26 from the pin 27 and to engage the pin 28 with the pin 21, thereby preventing further rotation of the turn-table 1 and shaft 65, and connecting the clutch shaft 16 to the pulley 17 to be rotated by the motor 19, as follows:—As the roller 82 enters the deep notch 105 of the cam 72, the shaft 31 and arm 32 carried thereby are rocked to cause the link 33 to engage the end of the slot 34 with the pin 35 and thereby actuate the arm 36 to rock the shaft 37, which, in turn, rocks the arm 38, carrying the bar 39, toward the plate 49. This operation causes the roller 47 to engage and move the bottom of the plate 49 outwardly until the off-set 53 escapes the end of the bell crank lever 54, thereby permitting the lever 54 to move, and the spring 61 to draw the link 56 in a manner to move the arm 57 to shift the clutch member 22 to disengage the pin 26 from the pin 27 and to engage the pin 28 with the pin 21, whereupon the clutch shaft 22 starts to rotate. The clutch shaft 16 is provided with a pinion 113 which, through a pair of idlers 114 and 115 mounted on a shaft 116, drives a gear wheel 117 secured to a cam shaft 118. By the mechanism actuated by the cam shaft 118, during one complete revolution thereof, the record disk upon the turn-table 1 is returned to the magazine 2, the lowermost record disk in the magazine is transferred to the turn-table 1, and the machine is automatically stopped with its various parts in position for a succeeding operation.

The magazine 2 comprises a bottom plate 119 and a top plate 120 supported by posts 121 rising from the bottom plate 119, the whole being supported upon the main frame 6. Extending between the plates 119 and 120 and journaled therein are three vertical rock shafts 122, 123 and 124. Secured to each of these shafts 122, 123 and 124 are the lugs 125 of a bar 126 provided with a vertically-arranged series of inwardly-projecting pins 127 which are adapted to support the record disks 3 one above the other and in spaced relation to each other; and slidingly fitted to each shaft 122, 123 and 124, so as to be vertically movable thereon, are the lugs 128 of a bar 129 also provided with a vertically-arranged series of inwardly-projecting pins 130 which are adapted to support the record disks 3 similarly to the pins 127. Each bar 129 is held normally raised with its upper lug 128 in engagement with the upper lug 125 of the adjacent bar 126 by the action of a suitable spring 131. When the bars 129 occupy the normal or raised position, the pins 130 occupy the same horizontal position as the pins 127, and when the bars 129 are depressed, the pins 130 move down a distance equal to the space between two adjacent pins 127. The position of the bars 126 and 129, and pins 127 and 130 is such that when the shafts 122, 123 and 124 are rocked back and forth the pins 127 and 130 may be alternately inserted between and withdrawn from the disks 3. Thus it will be seen that when the shafts 122, 123 and 124 are rocked to engage the pins 130 with the record disks 3, the weight of said disks will depress the springs 131 and lower the entire series of records 3 one step; and when said shafts are again rocked to engage the pins 127 with the disks 3, the lowermost disk 3 will be deposited upon the plate 119 and the springs 131 will raise the bars 129 to the normal position for a succeeding operation.

The upper plate 120 is provided on its under side with lateral, horizontally disposed guideways 132 adapted to receive and guide a record disk to a position where it will rest upon the uppermost pins 127; and the lower plate 119 is provided with similar guideways 133 arranged in line with the top of the turn-table 1 and adapted to guide a record disk from the plate 119 to the top of the turn-table 1.

Surrounding the turn-table 1 is a frame 135 which is vertically movable to a position in line with the guideways 132 and to a position slightly below the top of the turn-table 1. This frame 135 is slidingly fitted to guide rods 136 projecting vertically from the main frame 6. The frame 135 is pivotally connected to the upper ends of a pair of links 137 the lower ends of which are pivoted to arms 138 projecting from the respective ends of a rock shaft 139 which has its bearings in the main frame. The rock shaft 139 is provided with an arm 140 carrying on its free end a roller 141 which is engaged by a cam 142 fixed to the cam shaft 118, to the end that, when the cam shaft 118 is turned, the frame 135 will be raised and lowered by the action of the cam 142 upon the connections just described.

Fixed to a vertical rock shaft 143 is a horizontally extending arm 144 provided with an upwardly projecting pin 145, and fixed to the shaft 55 hereinbefore referred to, which is also a rock shaft, is a horizontally extending arm 146 provided with a downwardly projecting pin 147. The pin 145 is arranged to move through the bottom of the magazine 2 and the pin 147 is arranged to move through a plane above the turn-table 1 and in line with the top of the magazine 2 when the shafts 55 and 143 are rocked. The shafts 55 and 143 are provided with arms 148 and 149 respectively, which are connected by a link 150, and the shaft 55 is provided with an arm 151 which is connected by a link 152 to an arm 153 projecting from the outer end of a rock shaft 154 having its bearings in the main frame. The inner end of the shaft 154 is provided with an arm 155 carrying on its free end a roller 156 which is engaged by a cam 157 on the cam shaft 118. When the cam shaft 118 is turned, the shafts 55 and 143 are rocked in unison by the action of the cam 157 on the connections just described, and, in consequence of which, the pin 145 is moved from and toward the turn-table 1 and through the lower portion of the magazine 2, and the pin 147 is moved toward and from the upper portion of the magazine, for a purpose hereinafter explained.

The rock shaft 143 is provided with an arm 158 which is connected by a link 159 to a bell crank lever 160 secured to the rock shaft 122. This lever 160 is connected by links 161 and 162 to arms 163 and 164 secured to the rock shafts 123 and 124, respectively, to the end that, when the arms 144 and 146 are shifted to return a record disk to the magazine, the shafts 122, 123 and 124 will be rocked to engage the pins 127 with the disks 3, and, when the arms 144 and 146 are shifted to move a record from the magazine to the turn-table 1, the shafts 122, 123 and 124 will be rocked to engage the pins 130 with the disks 3. Thus it will be seen that, each time a disk is moved to the turn-table 1, the disks 3 in the magazine are lowered one step.

The operation of returning the record disk upon the turn-table 1 to the top of the magazine 2 and replacing it by the lowermost disk in the magazine may be briefly described as follows:—During the initial movement of the cam shaft 118, the cam 142 engages the roller 141 of the arm 140 and rocks the shaft 139, which, through the arms 138 and links 137, raises the frame 135. The frame 135 engages and carries therewith the record disk from the top of the turn-table 1 to a position in line with the guideways 132. The cam 157 now acts upon the roller 156 of the arm 155 and rocks the shaft 154 which, through its connections, rocks the vertical shafts 55 and 143 thereby moving the arm 146 toward the top of the magazine, and moving the arm 144 from a position adjacent to the turn-table 1 through and beyond the lower portion of the magazine 2. This operation causes the pin 147 to engage and move the record disk from the frame 135 and through the guide-ways 132 to the top of the magazine where it is deposited from the uppermost pins 127. During this same movement of the arms 144 and 146, the shafts 122, 123 and 124 are rocked to lower the record disks 3 one step and deposit the lowermost disk 3 upon the plate 119 as previously explained. The continued movement of the cam 157 causes the arms 144 and 146 to be moved in the reverse direction, during which operation the arm 144 is moved to its original position, and the pin 145 engages the disk 3 upon the plate 119 and moves it through the guideways 133 and onto the turn-table 1. After the disk 3 has entered the guideways 133 the frame 135 is lowered under the influence of the cam 142, and, before the lowermost disk in the magazine has been moved to the turn-table 1, the frame 135 has reached its lowered or original position for a succeeding operation. The frame 135 is provided with upwardly projecting stop pins 165 which limit the movement of the disk by the pin 145, and thereby insure the stoppage of the disk centrally upon the turn-table 1; and the posts 121 serve as a similar stop for the disks as they are returned to the magazine 2 by the pin 147. Extending between the plates 119 and 120 is a rod 134 from which projects a plate 134$^a$ which is adapted to act in conjunction with the posts 121 to maintain the record disks 3 in vertical alinement when the pins 127 and 130 are alternately engaged with said disks. It will be observed that the top of the plate 134ª is below the plate 120 and that the bottom of the plate 134ª is above the plate 119, thereby permitting the entrance of the disks to the top of the magazine and the exit of the disks from the bottom of the magazine as previously explained. When the sound box 94 was moved outwardly from the record disk upon the turn-table 1, as previously explained, it was also moved beyond the outside line of the frame 135, in order to permit the latter to be raised and lowered in returning the disk to the magazine; therefore, in order to return the sound box to its original position, that is, a position above the edge of the record disk upon the turn-table 1, I provide the following:—The rock shaft 55 is provided with a jointed arm 166, the respective members of which are held normally at substantially right angles to each other by a suitable spring 167 as shown in Fig. 3ª. The free end of the arm 166 is forked, and one side of the forked end extends beyond the other side thereof. As the arms 144 and 146 are swung to return a record disk to the magazine 2, the outer end of the jointed arm 166 engages a pin 168 projecting upwardly from the sound box 94, and the arm 166 yields against the action of the spring 167 until the short side of its forked end escapes the pin 168 and its long side is engaged therewith. Then, as the arms 144 and 146 are moved in the reverse direction, the arm 166 straightens out with its forked end engaging the pin 168 and forces the sound box 94 to its original position or above the edge of a record disk which, at the same time, is being moved to the top of the turn-table 1.

I shall now proceed to describe the mechanism for automatically cutting off the supply of current to the motor 19, and thereby stopping the machine.

The cam shaft 118 is provided with a cam 169 which is adapted to engage an arm 170 projecting from a horizontal rock shaft 171. The outer end of the shaft 171 carries an upwardly projecting arm 172 which is pivoted at its upper end to the plate 49 hereinbefore referred to. As the cam shaft 118 is turned to effect the transfer of record disk, the cam 169 engages the arm 170 and rocks the shaft 171, thereby causing the arm 172 to move the plate 49 against the action of the spring 52 to reëngage the off-set 53 with the lever 54 and to permit the spring 60 to move the bar 39 to return the roller 47 to a position to be engaged by the projection 48 of the plate 49. Just before the cam shaft 118 completes its revolution, the cam 169 escapes the arm 170 and permits the spring 52 to return the plate 49 to its original position, the plate 49 falling by gravity to reëngage the off-set 53 with the lever 54. As the plate 49 returns to its original position, the projection 48 engages the roller 47 and rocks the arm 41 to lift its extension 43 and contact points 44 from the mercury contact cups 45 thereby breaking the electric circuit 46 and stopping the machine with all its parts occupying their original positions for a succeeding operation.

While I have herein shown and described my invention in a desirable form yet I desire it to be understood that I do not limit myself to this particular construction as the same may be greatly modified without departing from the invention.

I claim—

1. In a sound reproducing machine, the combination of the frame thereof, a plurality of record disks supported one above the other in vertical series, means operative to move a record disk horizontally from said series into a playing position, means for rotating said record disk when in the playing position, and a sound reproducing device arranged to coact with said record when in the playing position.

2. In a sound reproducing machine, the combination of the frame thereof, a plurality of record disks supported one above the other in vertical series, means operative to move a record disk from said series into a playing position and from the playing position back to the series, means for rotating said record disk when in the playing position, and a sound reproducing device arranged to coact with said record when in the playing position.

3. In a sound reproducing machine, the combination of the frame thereof, a plurality of record disks supported one above the other in vertical series, means for automatically moving a record disk from said series into a playing position, means for rotating said record disk when in the playing position, and a sound reproducing device arranged to coact with said record when in the playing position.

4. In a sound reproducing machine, the combination of the frame thereof, a plurality of record disks supported one above the other in vertical series, means for automatically moving a record disk from said series into a playing position, and from the playing position back to the series, means for rotating said record disk when in the playing position, and a sound reproducing device arranged to coact with said record when in the playing position.

5. In a sound reproducing machine, the combination with a rotatable record support, rotating means therefor, the sound box, and the stylus, of a magazine, means for automatically transferring a record from the magazine to the support, and means for automatically transferring a record from the support to the magazine.

6. In a sound reproducing machine, the combination with a rotatable record support, rotating means therefor, the sound box, and the stylus, of a magazine, means for automatically transferring a record disk from the magazine to the support, and means for automatically transferring a record disk from the support to the magazine, and means for automatically stopping the machine.

7. In a sound reproducing machine, the combination with a rotatable record disk support, rotating means therefor, the sound box, and the stylus, of a plurality of record disks supported in vertical series, means for transferring the lowermost disk of the series to the support, and means for transferring a record disk from the support to the top of the series.

8. In a sound reproducing machine, the combination with a rotatable record disk support, rotating means therefor, the sound box, and the stylus, of a plurality of record disks supported in vertical series, means for transferring the lowermost disk of the series to the support, means for transferring a record disk from the support to the top of the series, and means for automatically stopping the machine.

9. In a sound reproducing machine, the combination with a rotatable record disk support, rotating means therefor, the sound box, and the stylus, of a plurality of record disks supported in vertical series, means for transferring the lowermost disk of the series to the support, means for transferring a record disk from the support to the top of the series, and means for lowering the series.

10. In a sound reproducing machine, the combination with a rotatable record disk support, rotating means therefor, the sound box and the stylus, of a plurality of record disks arranged in vertical series, a movable member provided with means adapted to engage and support the disks, a depressible member provided with means adapted to engage and support the disks, said depressible member also adapted to be depressed by the weight of the disks, means for alternately engaging said movable member and depressible member with the disks and thereby intermittently lower the disks, means for transferring the lowermost disk of the series to the support, and means for transferring a record disk from the support to the top of the series.

11. In a sound reproducing machine, the combination with a rotatable record disk support, rotating means therefor, the sound box, and the stylus, of a plurality of record disks arranged in vertical series, a set of bars pivoted to rock horizontally and provided with projections pins adapted to support said disks, a set of depressible bars also pivoted to rock horizontally and provided with projections pins adapted to support said disks, means for rocking both sets of bars to alternately engage their respective pins with the record disks and thereby intermittently lower said disks, means for transferring the lowermost disk of the series to the support, and means for transferring a record disk from the support to the top of the series.

12. In a sound reproducing machine, the combination with a rotatable record support, rotating means therefor, the sound box and the stylus, of a magazine, a reciprocative frame adapted to carry a record from the support, means for reciprocating the frame, means for transferring a record from the frame to the magazine, and means for transferring a record from the magazine to the support.

13. In a sound reproducing machine, the combination with a rotatable record support, rotating means therefor, the sound box and the stylus, of a plurality of records supported in vertical series, with the lowermost record substantially in alinement with said support, a vertically reciprocative frame adapted to carry a record from the support and into substantial alinement with the top of the series, means for transferring the lowermost record of the series to said support, and means for transferring a record from the frame to the top of the series.

14. In a sound reproducing machine, the combination with a rotatable record support, rotating means therefor, the sound box and the stylus, of a plurality of records supported in vertical series with the lowermost record substantially in alinement with said support, a vertically reciprocative frame adapted to carry a record from the support and into substantial alinement with the top of the series, means for transferring the lowermost record of the series to said support, means for transferring records from the frame to the top of the series, and means for lowering the series.

15. In a sound reproducing machine, the combination with a rotatable record support, a rotating means therefor, the sound box and the stylus, of a plurality of records supported in vertical series with the lowermost record substantially in alinement with said support, a vertically reciprocative frame adapted to carry a record from the support and into substantial alinement with the top of the series, a horizontally reciprocative arm adapted to move a record from the frame to the top of the series, a horizontally reciprocative arm adapted to move the lowermost record of the series to said support, and means for reciprocating said arms.

16. In a sound reproducing machine, the combination with a rotatable record support, rotating means therefor, the sound box and the stylus, of a plurality of records supported in vertical series with the lowermost record substantially in alinement with said support, a vertically reciprocative frame adapted to carry a record from the support and into substantial alinement with the top of the series, a horizontally reciprocative arm adapted to move a record from the frame to the top of the series, a horizontally reciprocative arm adapted to move the lowermost record of the series to said support, means for reciprocating said arms, and means for lowering the series of records.

17. In a sound reproducing machine, the combination with a rotatable record support, rotating means therefor, the sound box and stylus, of a magazine, means for transferring a record from the support to the magazine, means for transferring a record from the magazine to the support, automatic means for independently stopping the rotation of the support after the stylus has traversed the record groove, and means for automatically stopping the machine after a record has been transferred from the magazine to the support.

18. In a sound reproducing machine, the combination with a rotatable record support, rotating means therefor, the sound box, and the stylus, of a cam shaft, means operatively connected to the cam shaft for transferring records from the support to the magazine and from the magazine to the support, a clutch member, rotating means therefor, and means for alternately connecting said clutch member to the rotating means of the support and the cam shaft.

19. In a sound reproducing machine, the combination with a rotatable record support, rotating means therefor, the sound box, and the stylus, of a cam shaft, means operatively connected to the cam shaft for transferring records from the support to the magazine and from the magazine to the support, a clutch member, rotating means therefor, means for automatically disconnecting the clutch member from the rotating means of the support and connecting said member to actuate the cam shaft, and means for automatically stopping the machine.

20. In a sound reproducing machine, the combination with a rotatable record support, rotating means therefor, the sound box, and the stylus, of a magazine, means for automatically transferring a record from the magazine to the support and from the support to the magazine, and means for moving the stylus into and out of operative position.

21. In a sound reproducing machine, the combination with a rotatable record support, rotating means therefor, the sound box, and the stylus, of a magazine, means for automatically transferring a record from the magazine to the support and from the support to the magazine, means for moving the stylus into and out of operative position, and means for automatically stopping the machine.

22. In a sound reproducing machine, the combination with a rotatable record support, rotating means therefor, the sound box, and the stylus, of a magazine, means for automatically transferring a record from the magazine to the support and from the support to the magazine, means for stopping the rotation of said support during the transfer of records, and means for moving the stylus into and out of operative position.

23. In a sound reproducing machine, the combination with a rotatable record support, rotating means therefor, the sound box, and the stylus, of a magazine, means for automatically transferring a record from the magazine to the support and from the support to the magazine, means for stopping the rotation of said support during the transfer of records, means for moving the stylus into and out of operative position, and means for automatically stopping the machine.

24. In a sound reproducing machine, the combination with a rotatable record support, rotating means therefor, the sound box, and the stylus, of a magazine, means for automatically transferring a record from the magazine to the support and from the support to the magazine, means for moving the stylus into and out of operative position, means under the control of the inward movement of the stylus for stopping the rotation of said support, and means for setting in motion the means for transferring the record disks.

25. In a sound reproducing machine, the combination with a rotatable record support, rotating means therefor, the sound box, and the stylus, of a magazine, means for automatically transferring a record from the magazine to the support and from the support to the magazine, means for moving the stylus into and out of operative position, means, under the control of the inward movement of the stylus for stopping the rotation of said support, means for setting in motion the means for transferring the records, and means for automatically stopping the machine.

26. In a sound reproducing machine, the combination with a rotatable record support, rotating means therefor, the sound box, and the stylus, of a magazine, means for automatically transferring a record from the magazine to the support and from the support to the magazine, means for moving the stylus into and out of operative position, means under the control of the inward movement of the stylus for stopping the rotation of said support, means under the control of the inward movement of the stylus for setting in motion the means for transferring the records, and means for automatically stopping the machine after the transfer of records.

27. In a sound reproducing machine, the combination with a rotatable record support, the sound box, and the stylus, of a motor, a magazine, means for rotating said support, means for transferring a record from the magazine to the support and from the support to the magazine, means for operatively connecting the motor to drive the first and second named means alternately, and means for moving the stylus into and out of operative position.

28. In a sound reproducing machine, the combination with a rotatable record support, the sound box, and the stylus, of a motor, a magazine, means for rotating said support, means for transferring a record from the magazine to the support and from the support to the magazine, means for operatively connecting the motor to drive the first and second named means alternately, means for moving the stylus into and out of operative position, and means for automatically stopping the motor.

29. In a sound reproducing machine, the combination with a rotatable record support, the sound box, and the stylus, of an electric motor, an electric circuit therefor, a magazine, means for rotating said support, means for transferring a record from the magazine to the support and from the support to the magazine, means for operatively connecting the motor to drive the first and second named means, and means for automatically breaking the electric circuit.

30. In a sound reproducing machine, the combination with a rotatable record support, the sound box, and the stylus, of a motor, a magazine, means operatively connected to the motor for rotating said support, means operatively connected to the motor for transferring a record from the magazine to the support and from the support to the magazine, and means for moving the stylus into and out of operative position.

31. In a sound reproducing machine, the combination with a rotatable record support, the sound box, and the stylus, of a motor, a magazine, means operatively connected to the motor for rotating said support, means operatively connected to the motor for transferring a record from the magazine to the support and from the support to the magazine, means for moving the stylus into and out of operative position, and means for automatically stopping the motor.

32. In a sound reproducing machine, the combination with a rotatable record support, the sound box, and the stylus, of a motor, a magazine, means operatively connected to the motor for rotating said support, means operatively connected to the motor for transferring a record from the magazine to the support and from the support to the magazine, means for moving the stylus into and out of operative position, and means for stopping the rotation of said support during the transfer of records.

33. In a sound reproducing machine, the combination with a rotatable record support, the sound box, and the stylus, of a motor, a magazine, means operatively connected to the motor for rotating said support, means operatively connected to the motor for transferring a record from the magazine to the support and from the support to the magazine, means for moving the stylus into and out of operative position, means for stopping the rotation of said support during the transfer of records, and means for automatically stopping the motor.

34. In a sound reproducing machine, the combination with a rotatable record support, rotating mechanism therefor, the sound box, and the stylus, of a magazine, a clutch shaft, a cam shaft, gearing between the clutch shaft and cam shaft, means operatively connected to the cam shaft for transferring a record disk from the magazine to the support and from the support to the magazine, a rotatable clutch member, means for alternately engaging said member with said rotating mechanism and clutch shaft, and means for moving the stylus into and out of operative position.

35. In a sound reproducing machine, the combination with a rotatable record support, rotating mechanism therefor, the sound box, and the stylus, of a magazine, a clutch shaft, a cam shaft, gearing between the clutch shaft and cam shaft, means operatively connected to the cam shaft for transferring a record disk from the magazine to the support and from the support to the magazine, a clutch member, rotating means therefor, means for alternately engaging said member with said rotating mechanism and clutch shaft, means for moving the stylus into and out of operative position, and means for automatically stopping the rotation of said member.

36. In a sound reproducing machine, the combination with a rotatable record support, rotating mechanism therefor, the sound box, and the stylus, of a magazine, a clutch shaft, gearing between the clutch shaft and cam shaft, means operatively connected to the cam shaft for transferring a record disk from the magazine to the support and from the support to the magazine, a clutch member, rotating means therefor, means for alternately engaging said member with said rotating mechanism and clutch shaft, means for moving the stylus into and out of operative position, and means under the control of the cam shaft for automatically stopping the rotation of said member.

37. In a sound reproducing machine, the combination with a rotatable support, a grooved phonograph record thereon, means for rotating the support, the sound box, and the stylus, of means for moving the stylus into engagement with the record away from the groove thereof, and means for moving the stylus into engagement with the groove of the record after it has first been engaged with the record.

38. In a sound reproducing machine, the combination with a rotatable record support, means for supporting a series of records, and means adapted to be operated to shift a record horizontally from the series to the support.

39. In a sound reproducing machine, the combination with a rotatable record support, means for supporting a series of records and means adapted to be operated to shift a record from the support to the series.

40. In a sound reproducing machine, the combination with a rotatable record support, means for supporting a series of records and means adapted to be operated to shift a record from the series to the support and from the support to the series.

41. A machine comprising a carrier adapted to support a plurality of sound records; a rotary record support in proximity to said carrier and means operative to shift a record from the carrier to the support and from the support to the carrier as described.

42. In a sound reproducing machine, the combination with a record support, means for supporting a series of records, means operative to shift a record from the series to the support and means automatically operative to shift a record from the support to the series.

43. In a sound reproducing machine, the combination with the record support, means for supporting a series of records, means operative to shift a record from the series to the support, means automatically operative to shift a record from the support to the series and means for automatically stopping the machine.

In testimony whereof I affix my signature in presence of two witnesses.

JULIUS WELLNER.

Witnesses:
ANDREW V. GROUPE,
RALPH H. GAMBLE.